(12) United States Patent
Ergan et al.

(10) Patent No.: US 8,332,765 B2
(45) Date of Patent: Dec. 11, 2012

(54) PROBLEM REPORTING SYSTEM BASED ON USER INTERFACE INTERACTIONS

(75) Inventors: Cenk Ergan, Bellevue, WA (US); Raymond D. Parsons, Redmond, WA (US); Padma Varadharajan, Redmond, WA (US); Sathish K. Manivannan, Redmond, WA (US); Keren Shushan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 650 days.

(21) Appl. No.: 12/399,802

(22) Filed: Mar. 6, 2009

(65) Prior Publication Data

US 2010/0229112 A1 Sep. 9, 2010

(51) Int. Cl.
*G06F 3/048* (2006.01)
*G06F 11/07* (2006.01)

(52) U.S. Cl. ........ 715/764; 715/733; 715/810; 715/781; 702/183; 714/25; 714/46; 714/47.1

(58) Field of Classification Search .......... 345/418–475, 345/521; 715/764, 700, 733, 765, 781, 810; 702/183, 185; 717/124; 714/25, 39, 46, 714/47.1, 57
See application file for complete search history.

(56) References Cited

U.S. PATENT DOCUMENTS

| | | | |
|---|---|---|---|
| 6,237,138 B1 | 5/2001 | Hameluck et al. | |
| 6,384,843 B1* | 5/2002 | Harel | 715/762 |
| 7,086,032 B2 | 8/2006 | Nirell et al. | |
| 7,184,918 B2 | 2/2007 | Hamilton et al. | |
| 2004/0261026 A1* | 12/2004 | Corson | 715/704 |
| 2007/0101270 A1* | 5/2007 | Chianglin | 715/730 |
| 2007/0220365 A1* | 9/2007 | Castellani et al. | 714/46 |
| 2008/0119235 A1 | 5/2008 | Neilsen et al. | |
| 2008/0126283 A1* | 5/2008 | Odom et al. | 706/45 |
| 2008/0301101 A1 | 12/2008 | Baratto et al. | |
| 2008/0320343 A1* | 12/2008 | Eickmeyer et al. | 714/57 |
| 2009/0113327 A1* | 4/2009 | Pogrebinsky et al. | 715/765 |
| 2009/0207749 A1* | 8/2009 | Roskowski | 370/252 |

FOREIGN PATENT DOCUMENTS

WO WO 2008114212 A1 * 9/2008

(Continued)

OTHER PUBLICATIONS

"Free software to capture / record screen actions fit for developing tutorials, demo and help files," *Robin Good*, (Jun. 30, 2002) http://www.masternewmedia.org/2002/06/30/free_software_to_capture_record_screen_actions_fit_for_developing_tutorials_demo_and_help_files.htm, (7 pages) downloaded Dec. 26, 2008.

(Continued)

*Primary Examiner* — Xiomar L Bautista

(57) ABSTRACT

A system for reporting and analyzing problems encountered by computer users. The system includes a recording tool executing on a user computer to capture a sequence of user interactions in the context of a graphical user interface. When a problem or other stop event is encountered, the tool generates a report indicating user interactions leading to the stop event, including information such as the specific sequence of controls for specific programs accessed by the user. The report can be analyzed to identify a sequence of user interactions characteristic of a problem type, which in turn may be used to find a solution for a particular user's problem. The system may also include a server that receives and analyzes reports from multiple computer users to identify patterns of user interactions that characterize problem types. This information may be used for associating specific problems with future reports or to improve products.

17 Claims, 10 Drawing Sheets

FOREIGN PATENT DOCUMENTS

WO      WO 2009014455 A1 * 1/2009

OTHER PUBLICATIONS

"Adobe Captivate," http://www.educcomp.co.nz/adobe_captivate.htm, *Educcomp*, (7 pages) downloaded Dec. 26, 2008.

"TechSmith Rich Recording Technology™: Digitally Synchronizing Data from People and Systems," *MORAE*, © 2007 http://download.techsmith.com/morae/docs/whitepapers/techsmith_rrt_whitepaper.pdf (2 pages) downloaded Dec. 26, 2008.

"Bug Shooting," © 2007 http://www.bugshooting.com/web/index.php5, (1 page) downloaded Dec. 26, 2008.

"Snagit Screen Capture Software," *TechSmith*,© 1995-2008 http://www.techsmith.com/snagit/features.asp, (2 pages) downloaded Dec. 26, 2008.

* cited by examiner

PROBLEM REPORTING SYSTEM BASED ON USER INTERFACE INTERACTIONS

BACKGROUND

Computer users sometimes find their computers behave in unexpected ways. This unexpected behavior may be due to the user's unfamiliarity with the computer's hardware or software or due to a malfunction. Having encountered a problem, a user is typically compelled to overcome the problem in some way.

A user may attempt to discover the nature of the problem and its solution by experimentation. The user may experiment with alternative ways of performing the desired function or with reconfiguring the computer through software.

Sometimes, users will attempt to search a user group for a solution to the problem. If the user cannot identify a solution from the existing user group posts, the user may choose to describe the problem encountered in a post to the group. Typically the user will then check the user group for a response or will be notified when a response has been posted.

When available, the user may contact a technical support service for help with the problem.

Of course, the user may simply avoid the problem by discontinuing use of the feature or program that was in use when the problem was encountered.

However the user chooses to address the problem, the process of searching for a solution may be frustrating to the user and may require a considerable investment of time from the user and those who have come to his/her aid. The unexpected frustration and loss of time the user encounters detracts from the overall user experience.

Automated error reporting services have been employed to improve user experience. When a problem, such as an application crash or hang, occurs, an agent on a computer may collect information about the state of the program that experienced the problem. Typically, this information includes a stack dump, an instruction trace and other information about a process in which the application that experienced a problem was executing at the time of the problem or in an interval before the problem occurred.

The information is then transmitted to a server. The server may aggregate information from multiple computers, potentially over a long period of time. The aggregated information may be analyzed by a development team for the program that experienced the problem and can therefore be used in upgrading the program to avoid problems in the future.

SUMMARY

An improved problem reporting system is provided that captures a series of user interactions in the context of a graphical user interface prior to occurrence of a problem or other event identified as a stop event. The series of user interactions may be communicated to any of one or more locations to improve the user experience.

In some embodiments, the reports may be communicated to other individuals, such as support personnel or friends, to enable those individuals to understand the problem. In such embodiments, the reports may be formatted to enable others to quickly understand the scenario in which the problem was experienced.

In some embodiments, the reports may be sent to an error reporting service that may aggregate problem reports from multiple computers to identify patters of user interactions that lead to a problem. Recognized patterns giving rise to problems may be reported to program developers so that the developers may improve their programs. Alternatively or additionally, recognized patterns that characterize problems may be recorded and linked to information about resolving those problems. As problems occur in the future, reports of those problems may be analyzed to determine whether they contain a pattern of user interaction associated with a problem. When a known pattern is detected, information about resolving the problem may be provided.

To capture a series of user interactions, a recording tool on a computing device may be enabled to capture a user's interactions with the computing device. Subject to appropriate filtering, each user interaction is recorded as an event record. The event record contains information about the user's input, and metadata about the target object in the user interface associated with the user input occurred. For example, the user interaction of clicking on a mouse button while a cursor is positioned at a specific location in relation to a display screen may be translated to a user interaction in the context of a graphical user interface by ascertaining a pop-up window that was active at the time the mouse click was detected and a user interface button in that window when clicked.

The recording tool may be started and stopped by in any of a number of ways. The user directly may start or stop the tool or, subject to the user's consent, the tool may be started by events detected based on commands from an error reporting service or a customer support team. For example, the recording tool may be configured based on external input to begin recording when a certain process is loaded and stop recording when the same process is terminated.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized an appreciated that an improved problem reporting system can be provided by generating problem reports in the context of graphical user interface actions rather than process state at times leading up to a problem or other stop event. Actions within the context of a graphical user interface may be more meaningful to a support organization or others offerings help on a problem and may be more readily used to classify problems so that future problem reports may be more readily correlated to previously discovered problems for which solutions may be available.

In order to make it easier for a user to report a problem, and ultimately find its solution, a tool for recording user interactions with a computing device is provided. The tool records user interactions, including input events such as mouse and keyboard commands and metadata about the objects within a graphical user interface with which these interactions occur. Upon occurrence of the stop event, the tool then creates a report containing an event record from recorded user interactions.

The report may be used in any of a number of ways to ultimately improve the user experience. As one example, the report may be formatted in an easy-to-read format. The user may review the report to provide annotations or ensure that any information the user does not wish to share has been removed by the tool. The report may then be analyzed and/or shared with a technical support staff or others who may be able to help the user identify and solve the problem encountered.

Alternatively or additionally, the report may be sent to a server where it is analyzed in connection with other reports received from other users. The analysis may identify patterns in the user interactions that characterize the type of problem the user encountered. Having identified the problem, the back end server may then search an appropriate database for a solution to the problem. After a solution is identified it may be provided to the user. When patterns of user interactions are detected for which no corresponding problem type has been identified, those problems may be investigated. Information about the problem and the solution may be stored for providing to other users who experience the same problem in the future. Alternatively or additionally, information about an identified problem may be provided to a software developer who may update the program that experienced the problem.

In some embodiments, the tool may run only during certain intervals and may be disabled at other intervals. Accordingly, the tool may contain a mechanism to enable and disable recording and/or reporting of events. Control inputs to the tool to enable or disable recording and/or reporting of events may be provided from one or more sources. For example, a user may enable recording or, with user consent, an error reporting service or technical support service may enable or disable recording.

Figure 1:
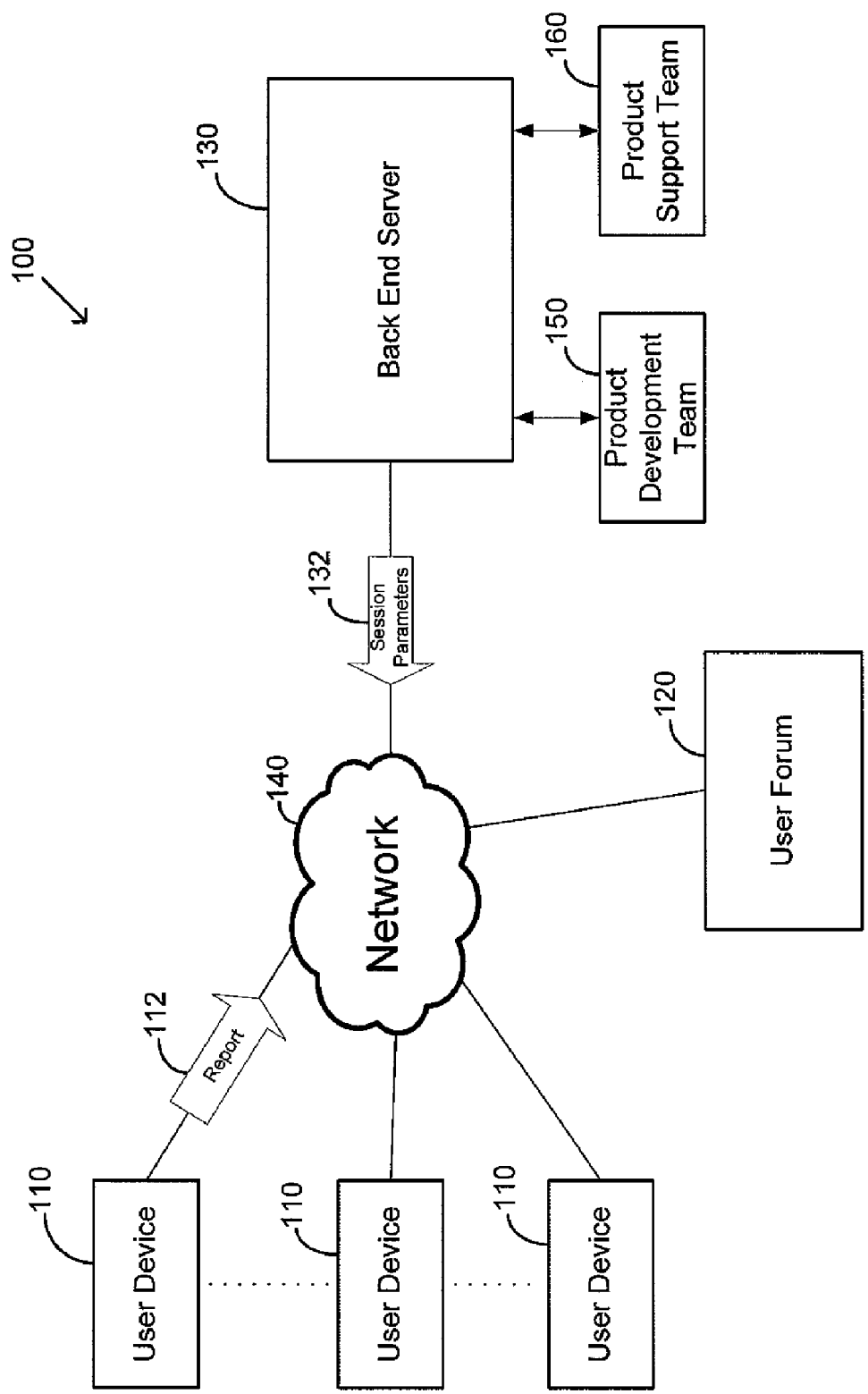
FIG. 1 is a block diagram of a problem reporting system according to some embodiments.

FIG. 1 shows a problem reporting system 100 in which the tool may be used. System 100 may include any number of user devices 110 connected to a back end server 130 over a network 140. A copy of the tool may be installed on each of the user devices 110. When the tool records a sequence of user interactions with the computing device 110, the records may be sent as a report 112 over the network 140.

The reports may be sent to one or more locations, which may depend on the purpose for which the tool is being used. In some embodiments, the tool may be used to assist a user creating a description of a problem experienced by the user. In such a scenario, a report created by the tool may be sent to solicit support.

Any suitable entity may be solicited for support. For example, the report 112 may be emailed to another user, shared with other users in an online user forum 120, or sent to the back end server 130 that provides a connection to a product support team 160. Though, back end server 130 may be equipped with resources for analyzing the report 112 to identify a type of problem encountered by the user and automatically provide appropriate solutions.

Alternatively or additionally, the tool may be used as part of an error reporting system that aggregates error reports from multiple user devices to identify problems with software or other components of those devices. In such an embodiment, reports of problems for multiple user devices may be aggregated on back end server 130. The aggregated reports may be analyzed to detect patterns of user interactions that characterize problems. Such patterns of user interaction may provide useful information to a product developer for identifying and correcting bugs in software products installed on user devices 110.

Accordingly, a product development team 150 may also access the resources of the back end server 130. In some embodiments, the back end server 130 records statistics about the type and frequency of problems encountered by users. The product development team 150 may utilize the statistical information to identify and prioritize improvements to aspects of the product.

In some embodiments, the copies of the tool installed on user devices 110 may record user interactions and/or send reports at controlled times as a way to reduce the load that the tool places on a user device. Accordingly, the tool on each user device 110 may be controlled to record user interactions during specific sessions.

In order to assist a user record relevant user interactions, the product support team 160 may define session parameters 132 which are sent to a user device 110 over the network 140. The session parameters may include triggers for the tool to start and/or stop recording user interactions.

The network 140 provides access between the user devices 110, the user forum 120, and the back end server 130 via any of the Internet, an extranet, an intranet, and the like. Network 140 may be any type or combination of wired or wireless networks. Examples of suitable networks include Personal Area Network (PAN), Local Area Network (LAN), Campus Area Network (CAN), Metropolitan Area Network (MAN), Wide Area Network (WAN), Global Area Network (GAN), and the like.

Any suitable communications protocol may be used by network 120. For example, the network 120 may support any of IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Protocol), SSH (Secure Shell Protocol), POP3 (Post Office Protocol 3), SMTP (Simple Mail Transfer Protocol), IMAP (Internet Message Access Protocol), and the like.

Figure 2:
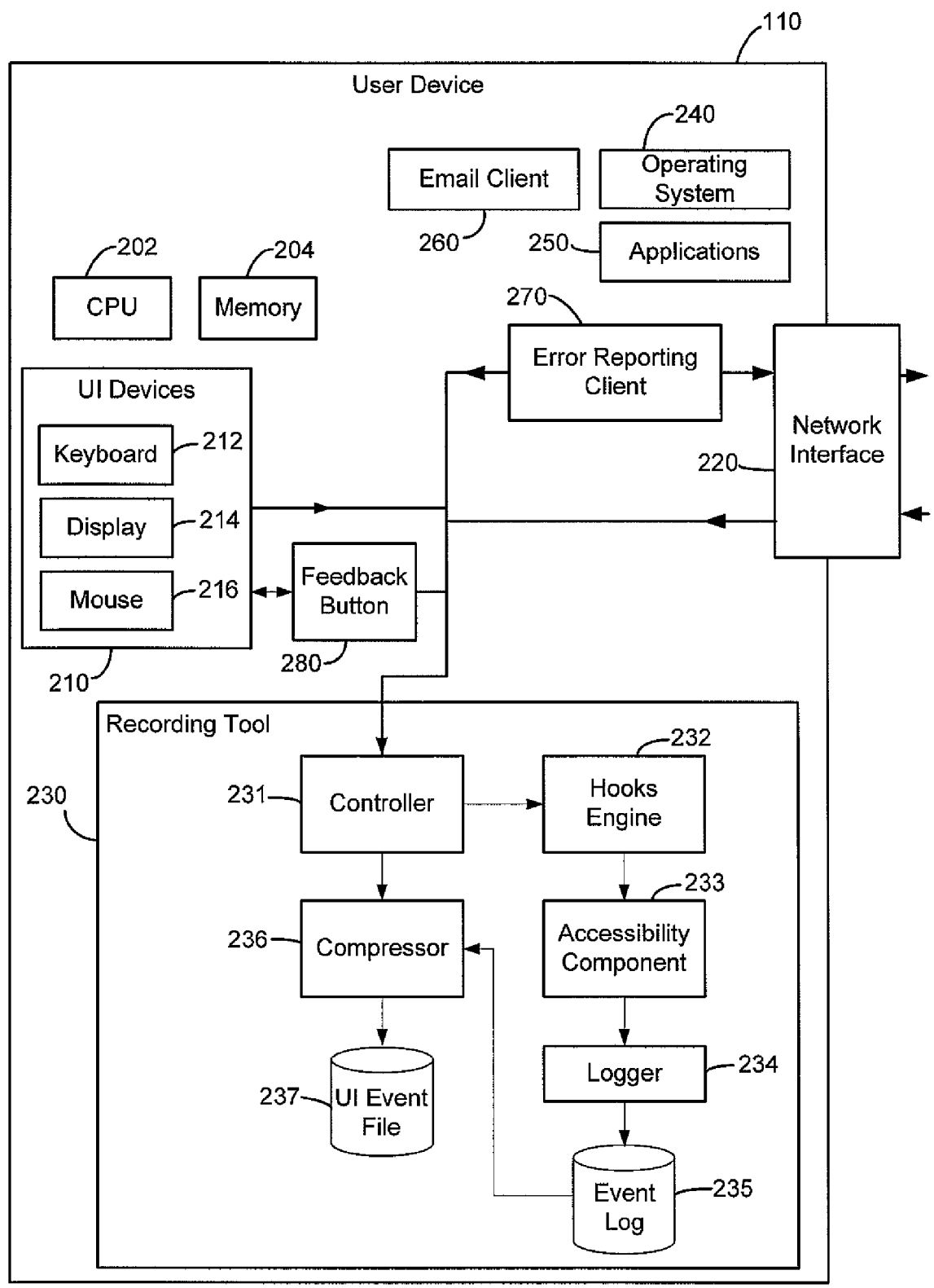
FIG. 2 is a block diagram of a user device including a recording tool for recording user interactions according to some embodiments.

Having provided with reference to FIG. 1 an overview of the system 100, attention is now turned to FIG. 2 which shows an example user device 110 having a recording tool 230. User device 110 may be any suitable type of computing device.

User device 110 includes a processor 202 operably connected to a memory 204. Processor 202 may be any suitable processing device such as, for example and not limitation, a central processing unit (CPU), digital signal processor (DSP), controller, addressable controller, general or special purpose microprocessor, microcontroller, addressable microprocessor, programmable processor, programmable controller, dedicated processor, dedicated controller, or any other suitable processing device.

Memory 204 may be integrated into processor 202 and/or may include "off-chip" memory that may be accessible to microprocessor 202, for example, via a memory bus (not shown). Memory 204 may store software modules that when executed by processor 202 perform a desired function. Memory 204 may be any suitable type of computer-readable storage medium such as, for example and not limitation, RAM, a nanotechnology-based memory, one or more floppy discs, compact discs, optical discs, volatile and non-volatile memory devices, magnetic tapes, flash memories, hard disk drive, circuit configurations in Field Programmable Gate Arrays, or other semiconductor devices, or other tangible computer storage medium.

The user device 110 also includes a user input mechanism. In the example of FIG. 2, user interface (UI) devices 210 permit a user to interface with the computing device. Suitable UI devices include, for example and not limitation, a keyboard 212, a display 214, a mouse 216, a trackball, a speaker, a microphone, a touch screen, a digital pen, or any other suitable user interface device. Keyboard 212, display 214 and mouse 216 are shown explicitly in FIG. 2 for example purposes only. Embodiments may utilize any suitable user interface device or combination of user interface devices. Regardless of the type of user interface device present, a user may provide input by actuating the device. In a system in which the user device receives user input through a graphical user interface, the user inputs may be received in the context of the graphical user interface.

For example, a graphical user interface may contain one or more display areas, sometimes called "windows." Each display area may contain one or more controls or active elements. By selecting a display area and a control within the display area, the specific user action with an input device may have a different meaning. In this way, the user actuation of an input device may have a different effect depending on the context within the graphical user interface of the user action. For example, a mouse click on one control in a display area may have a different effect than the same mouse click within a different control in a different display area. As is known in the art, an operating system 240 on user device 110 may relate specific user actions in the context of the graphical user interface to specific functions.

One component that may be implemented using UI devices 210 and a graphical UI is feedback button 280. When a user actuates a user input device in connection with feedback button 280, operating system (OS) 240 may invoke tool 230. The user device 110 also includes a network interface 220 for communicating over the network 140 (FIG. 1). Network interface 220 may be any suitable combination of hardware and software configured to communicate over the network 140. For example, the network interface 220 may be implemented as a network interface driver and a network interface card (NIC). The network interface driver may be configured to receive instructions from other components of user device 110 to perform operations with the NIC. The NIC provides a physical connection to network 140. The NIC is configured to generate and receive signals for communication over network 140.

The user device 110 may include computer executable software modules. The software modules may be stored in memory 204, and executed by processor 202, though this is just an illustrative embodiment and other storage locations and execution means are possible. In some embodiments, the recording tool 230, OS 240, applications 250, email client 260, error reporting client 270, and the feedback button 280 may be implemented as computer executable modules. However, these components may be implemented using any suitable combination of hardware and/or software.

OS 240 may provide functions for applications executing on user device 110. In addition, OS 240 may manage the activities and sharing of resources of user device 110. The OS 240 may implement management through various components, only some of which are illustrated in FIG. 2 for simplicity. In some embodiments, at least some of the recording tool 230, applications 250, email client 260, error reporting client 270, and the feedback button 280, are implemented as computer-executable components of OS 240.

Error reporting client 270 may be a component as known in the art for implementing an error reporting system. Error reporting client 270 may record a memory dump from user device 110 upon a crash or hang of an application running on the user device 110. For example, if an application terminates unexpectedly, the error reporting client 270 may record the final values of relevant locations in memory 204 to a log file. This log file may be provided, upon user consent, to the back end server 130 over network 140 (see FIG. 1).

The recording tool 230 may be used to report a sequence of user interactions with the user device 110. These interactions may be made using the UI devices 210.

In some embodiments, recording tool 230 may capture and store indications of user interactions during "sessions" whenever the tool is enabled. The recording tool 230 may record user interaction in a recording session. If an event to be reported occurs during a session, the tool 230 may generate an appropriate report based on recorded user interactions. Properties of the recording session may be defined by session parameters. The session parameters may define one or more start and stop events to begin and end a recording session. The session parameters may include filtering instructions about what user interactions are to be recorded. For example, the filtering instructions may instruct the recording tool 230 only to record user interactions with a particular application and ignore other user interactions. Other session parameters may include how many user interactions to record to the event log 235 (e.g., on a first in first out basis), definitions about the capturing of screen shots, locations in the memory 204 to save files such as the event log 235 and the UI event file 237, a destination to send the resulting report and any other information that may be used to control a recording session.

Session parameters may be defined manually by a user of user device 100 or may be provided from an external source, such as the product support team 160 (FIG. 1). As another example, session parameters may be defined remotely by the back end server 130 in response to an error report received from the error reporting client 270 of the user device 110. For example, the session parameters may define start and stop events to correspond to the loading and termination of an application that crashed and resulted in the error report. If the program crashes, that is, terminates unexpectedly, the subsequent error report may be augmented by a report of the user's interactions with the application. In some embodiments, the error reporting client 270 may define session parameters directly. As another example, the back end server 130 may define session parameters based on analysis of user interactions reports received from other user devices. In this way the back end server 130 may be able to obtain additional information about a problem likely to occur on the user device 110. The recording tool 230 may keep track of multiple, independent sets of session parameters.

When any one of the start events corresponding to a set of session parameters is detected, the recording tool 230 begins a recording session using the corresponding session parameters. The recording session is terminated when the stop event for that set of session parameters is detected. Start and stop events may be defined in any suitable way. In some embodiments, a start and/or stop events may be triggered by a user input such as clicking on an object in the user interface of the recording tool 230. In another embodiment, the start and/or stop event may be triggered by a process being performed by the user device 110. For example, a start and/or stop event may be triggered when an application 250 is loaded or unloaded; when a timer reaches a set time; when a particular process or thread starts, stops or hangs; when an event occurs within the execution of a process; when a piece of hardware is disconnected; when a network connection is established or lost; or when any other suitable event is detected. Because multiple start and/or start events may be defined by the session parameters, a session may begin or end for any of multiple reasons.

In addition to defining the start and stop events for a recording session, session parameters may also define filtering instructions. The filtering instruction may configure the recording tool 230, for example, to record all user interactions or only user interactions associated with a particular application. By default user interactions that provide identifying information, such as keystrokes in password fields and keystrokes that do not provide an execution command to the computer (e.g., typing in a word processor) are not recorded at all or without the specific character values entered. In some embodiments, the user may specify minimum filtering levels that override any more lenient filtering instructions that may be provided to the recording device via a set of session parameters.

Operation of the recording tool 230 is described with reference to several components. The partitioning of the recording tool 230 shown in FIG. 2 is illustrative and it should be appreciated that partitioning of the functionality is optional. Further the functions of the recording tool may be partitioned in any suitable way using any suitable combination of hardware and/or software components.

In the illustrated embodiment, the recording tool 230 includes several components to record user interactions and generate reports. Although each component illustrated is shown as part of the user device 110, some components may be called from other modules of the user device 110. For example, the tool or some components of the tool may be part of the operating system 240.

The recording tool includes a controller component 231 that receives session parameters and monitors the user device 110 for start and stop events defined by the session parameters. The monitoring may be performed in any suitable way including periodically checking status of components or registering for notifications.

When the controller component 231 identifies a start event it initializes a recording session. The controller component 231 subscribes to the hooks engine 232 to receiver user interface events. Appropriate log files may also be created such as the event log 235. However, event log 235 may be created at any suitable time, such as when the start event trigger is defined or following the first event to be logged.

The hooks engine 232 may record events during operation of user device 110. Hooks engine 232 may be implemented using event tracing technology as is known in the art. For example, functions and other components within operating system 240 may be instrumented with event tracing function calls at entry and exit points of those components. The event tracing functions may, when called, record an event in an event stream. Such an event stream, therefore, provides information about the timing and order of events that occur during operating of user device 110. Hooks engine 232 may tap into this event stream to identify events associated with user interaction with user device 110. For example, hooks engine 232 may identify from the event stream input events, such as keyboard events, mouse events, pen events, touch screen events, and the like.

Though the event data captured by hooks engine 232 may provide indications of user interaction with device 110, this data will not be in the context of the user interface through which the user interacts with user device 110. For example, the event stream can indicate that a user activated a control button on a mouse. However, a mouse click in the context of a user interface may indicate a user selection of a specific command to be performed by an executing application program. The event stream captured by hooks engine 232 is raw event data that does not contain user interface context information. To provide information more useful for characterizing and diagnosing problems, the raw event data captured by hooks engine 232 may be filtered and formatted to reflect user actions in the context of a user interface presented during operation of user device 110.

To facilitate formatting of event data, the data relating to user inputs captured by hooks engine 232 may be processed with an accessibility component 233. Accessibility component 233 identifies a user interface (UI) object in the UI stack associated with the trapped user input. The accessibility component 233 provides metadata about the UI object so that the user action of actuating a user interface element may be related to an action in the context of a graphical user interface of device 110. The metadata may include information about the function of the UI object that was targeted by the user input and the functions of all its parents. Such information may include, for example and not limitation, the program ID and file ID with which the target UI object is associated, a title of the window, the command line used to launch the process that defined the UI object, and any other information that may be associated with the target UI object. For example, if a user clicks on a button in a pop-up message box for an application, the accessibility component 233 captures information about the button on the message box clicked by the user, information about the message box dialog itself, and information about the parent window and its parents, if any. A relative or absolute time stamp may be recorded with the metadata to identify the time at which the user interaction took place.

As an example in the context of the MICROSOFT® WINDOWS® operating system environment, the accessibility component 233 may output the following string as metadata for a user left click on the Notepad icon from the start menu: "AccLClick°AccObj=°[°A:
°Notepad®SCR_MENUITEM°°]::[°A:°°SCR_MENUPOPUP° °]::[°W:°°SysListView32°CHILD°]::[°W:°°DesktopSFTBarHost°CHILD°]::[°W:°°Desktop Open Pane Host°CHILD°Id=°0x1°]::[°W:°Start Menu°DV2ControlHost°°]."

In some embodiments, the accessibility component 233 utilizes application programming interfaces of the OS 240. For example, in a MICROSOFT® WINDOWS® operating system environment, the accessibility component may utilizes Microsoft active accessibility (MSAA) technologies to obtain context information about user actions.

The accessibility component 233 delivers information on the user interaction to the logger 234. Logger 234 is configured to record this information as an event record to the event log 235. The location of the event log 235 may be defined by the session parameters, or stored in a temporary location in memory 204 until completion of the recording session.

The event log 235 may be recorded by the logger 234 in any suitable way. In some embodiments, the logger 234 records to the event log 235 in a continuous fashion. That is, each new user interaction received from the accessibility component 233 is recorded as an event record to the event log 235 without regard to the file size or the total number event records recorded. In another embodiment, a predetermined number of events are recorded to the event log 235. After the predetermined number of event records have been recorded, each subsequent event replaces the oldest event in the event log on a first in, first out (FIFO) basis. As another alternative, the size of event log 235 may be constrained. When the event log 235 is full, subsequent events may be recorded by writing over the oldest events in the file. In some embodiments, how the logger 234 records events to the event log is defined by the session parameters.

In some embodiments, only a subset of events associated with user interactions with user device 110 may be recorded in event log 235. In such an embodiment, logger 234 may implement a filtering function. The filtering may be based on session parameters or other suitable criteria. The criteria may be provided through user input or may be obtained over network 140 from one or more other sources. Regardless of the specific filtering criteria used and the source of the filtering criteria, information on events meeting the criteria is stored in event log 235. The event log 235 may be saved in any suitable file format. In some embodiments, the event log is stored as an XML file.

The recording tool 230 further includes a compressor component 236 for compressing and processing the event log 235 to create a UI event file 237 and, in some scenarios a report. The compressor 236 may apply the filtering instructions from the session parameters to determine which event records are to be extracted from the event log 235 and stored in event file 237.

In some embodiments, the amount of information stored may depend on session parameters. Compressor 236 may be configured to determine whether user input targets a UI object that the recording tool 230 is to log in accordance with the filtering instructions in the session parameters. If the user input does not target a UI object that is to be logged, the compressor 236 may disregard the user interaction and not record it in UI event file 237. If, however, all user events are being recorded or the present user interaction is an interaction to be recorded, records the user interaction in UI event file 237, including information about the user input obtained from the hooks engine 232 and the metadata associated with the target UI object. In some embodiments, the decision to log a user interaction is based on both the type of user input and the target UI object. For example, a UI object may respond to a left mouse click differently than a right mouse click. The compressor 236 may be configured, according to the filtering instructions, to record both types of interactions, one or the other, or neither.

Compressor 236 may begin operating on the event records at any suitable time. For example, in some embodiments the compressor 236 begins retrieving event records from the event log 235 after a stop event has occurred with an indication that a problem report should be sent. An application crash, for example, may be both a stop event and an indication that an error report should be sent. Though, it is not a requirement that information be stored in UI event file 237 only in scenarios in which a report is to be sent. In some other embodiments, the event records are retrieved by the compressor from the event log 235 before a stop event has occurred. In yet some other embodiments, the compressor 236 receives information about the user interactions, including user input information and metadata, directly from the accessibility component 233.

In some embodiments, the compressor 236 is configured to review each event record and remove any sensitive information in accordance with the filtering instructions specified by the session parameters. If the filtering instructions specified by the session parameters are more relaxed than the minimum filtering levels specified by the user, the filtering instructions in the session parameters are overridden to comply with the user set levels. The filtering instructions may, for example, instruct the compressor to remove the actual letters pressed during key strokes and trapped by the hooks engine 232.

The compressor 236 may optionally be configured to translate the relevant event records from the event log 235 into a human readable format such as a natural language of the user. For example, an event record in the event log 235 may be translated into simple language such as "user left click on notepad from the start menu."

The compressor 236 records each filtered event record extracted from the event log 235 and the user friendly translation of the event record to the UI event file 237. The compressor may also save screen shots, if they were captured, in the UI event file 237.

The recording tool 230 may optionally record screen shots in association with some or all of the user interactions. In some embodiments, by default, screen shots are not recorded. A selection may be made by the user or the entity defining the session parameters as to whether screen shots should be recorded.

The logger 234, or any other suitable component of tool 230, may be configured to capture screen shots in any suitable way. Screen shots may be recorded for every user interaction or just some user interactions, such as the first and/or last user interaction. Screen shots may be captured for the entire display area or cropped to include only the active window associated with the target UI object. Screen shots may be taken for all interactions or only for user interactions with a particular process. As an example, in some embodiments, the logger 234 may be configured to capture full screen shots for the first and last interactions and screen shots cropped to the active window for the intervening interactions. Techniques for capturing screen shots, such as reading from a frame buffer that defines the display, may be used.

The screen shot may be saved in any suitable format such as, for example and not limitation, JPEG, TIFF, RAW, PNG, GIF, BMP, PPM, PGM, PDF, PS, or any other suitable format. A link to the file location and the screen shot may be recorded as part of the metadata for the user interaction. In some embodiments, the screen shot may be incorporated directly into the metadata for the user interaction.

The compressor 236 may be configured to black out, blur, or otherwise remove personal information from any screen shots that are to be recorded to the UI event file 237.

In some embodiments, the compressor 236 creates a document formatted for easy review by the user and/or a technical support staff member and includes it in the UI event file 237. For example, an HTML document may be provided that displays chronologically the user interactions with a natural language description of the interaction. In some embodiments, the event record itself is recorded as optionally displayed text in such a document.

The compressor 236 may be configured to compress and save the UI event file 237 in any suitable file format. For example, the UI event file may be saved as a CAB file. Known compression techniques may be used to reduce the size of UI event file 237. Such compression may be useful, for example, when the UI event file 237 is transmitted over network 140 (FIG. 1) or when it is desired to reduce storage space within the memory of user device 110. Though, any suitable compression technique may be used.

After the compressor 236 has processed all events to be included in the UI event file 237, the UI event file may be reviewed by the user. The recording tool may display the UI event file in a graphical user interface (GUI) that enables the user to ensure that any personal information which the user does not wish to share has been removed. Additionally, the user may wish to provide additional comments and annotations to the UI event file. For example, the user may comment on individual user interactions or comment on certain features displayed on screen shots also saved in the UI event file. The user may add general annotations explaining what the user was trying to accomplish when performing the sequence of user interactions. During the review process, a tool may be provided to enable the user to delete text from the report or black out portions of screen shots that the user does not wish to share.

Once the user has had the option to review and possibly annotated the UI event file 237, the file can serve as a completed report. The controller 231 may provide instructions to the network interface 220 to transmit the report over the network 140 to a support entity. For example, the report may be transmitted using email client 260, transmitted over the network 140 to user forum 120, or transmitted to the back end server 130 (FIG. 1).

In some embodiments, the report is only transmitted once a user has consented, such as by pressing a button implemented as part of the user interface requesting consent to send the report.

Figure 3:
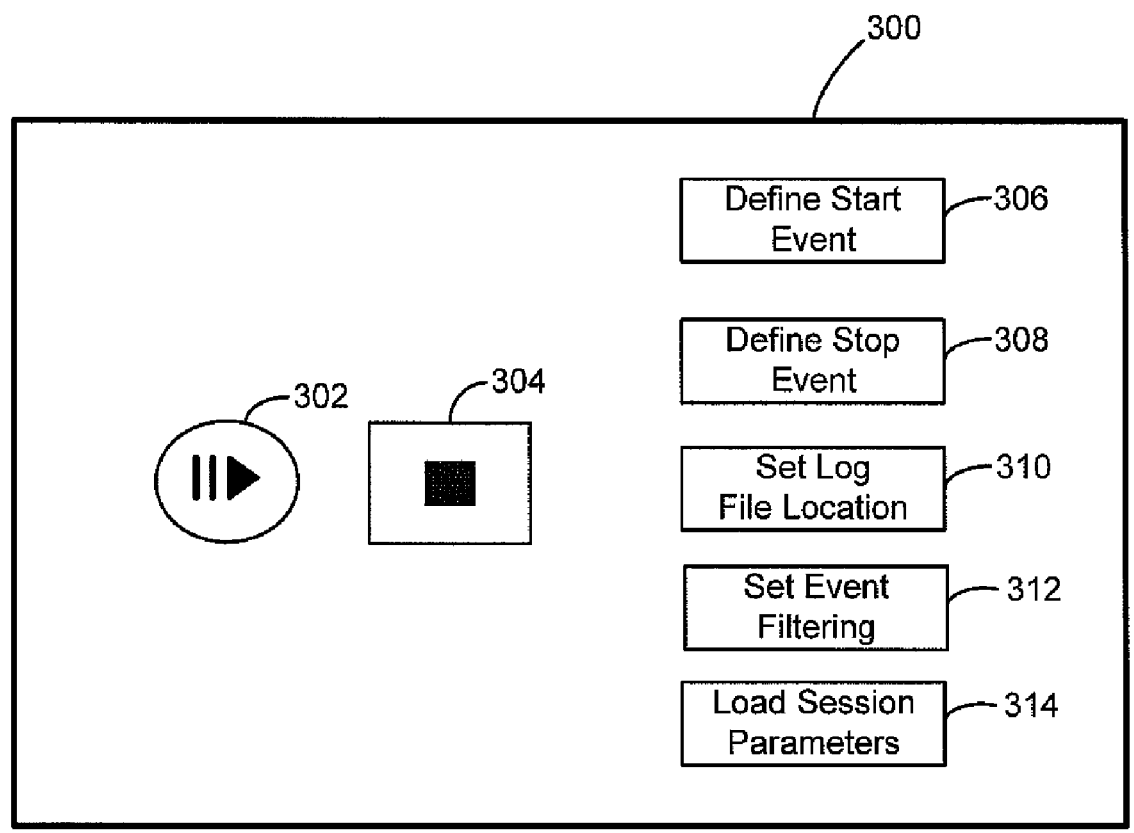
FIG. 3 is a graphical user interface of the recording tool of FIG. 2 according to some embodiments.

The recording tool 230 may have any suitable user interface for receiving commands from users. For example, users may interact with the recording tool through a command line or graphical user interface (GUI). FIG. 3 provides an illustration of a GUI 300 for the recording tool 230 according to some embodiments. GUI 300, for example, may be presented to a user in response to the user activating feedback button 280 (FIG. 2), indicating that the user wishes to create a report detailing user interactions with user device 110 leading up to an event.

The GUI 300 includes a start/pause/resume button 302. The start/pause/resume button 302 may be selected by the user as a start event, triggering the beginning of a recording session. During a recording session, the start/pause/resume button 302 may be selected by the user to temporarily suspend (pause) the recording session until the button 302 is clicked again to resume the recording session. Event records are not recorded when the recording session is paused. In some embodiments, the start, pause, and resume functionality is provided by two or more user interface buttons. In some embodiments an event record is recorded to the UI event file for the start event, and for each pause and resume event which occurred during the recording session.

The GUI 300 may also include a stop button 304. The stop button 304 may be selected by the user as a stop event to terminate a recording session. In some embodiments, the stop button 304 may be used to terminate a recording session before a stop event defined by the session parameters is reached. In some embodiments, an event record is recorded to the UI event file for the stop event.

The GUI 300 may also include controls for defining and/or loading session parameters. For example, the controls define start event 306, define stop event 308, set log file locations 310, and set event filter 312 may be used to define the respective parameters of the recording session. Each control may be a clickable control that brings up a menu of options for the user. A load session parameters button 314 may be provided to activate the session parameters entered or load session parameters from a saved file. Once a set of session parameters are loaded through the GUI, the recording tool may begin monitoring for the defined start condition.

Figure 4A:
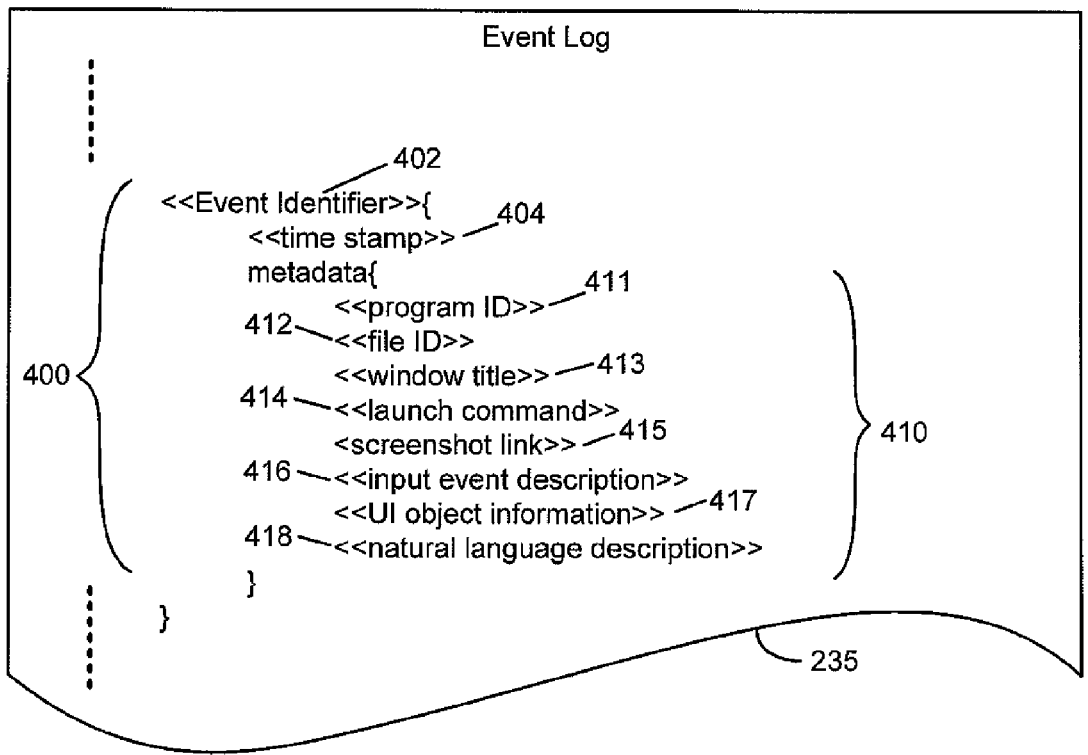
FIG. 4A is a portion of an event log corresponding to a user interaction according to some embodiments.
Figure 4B:
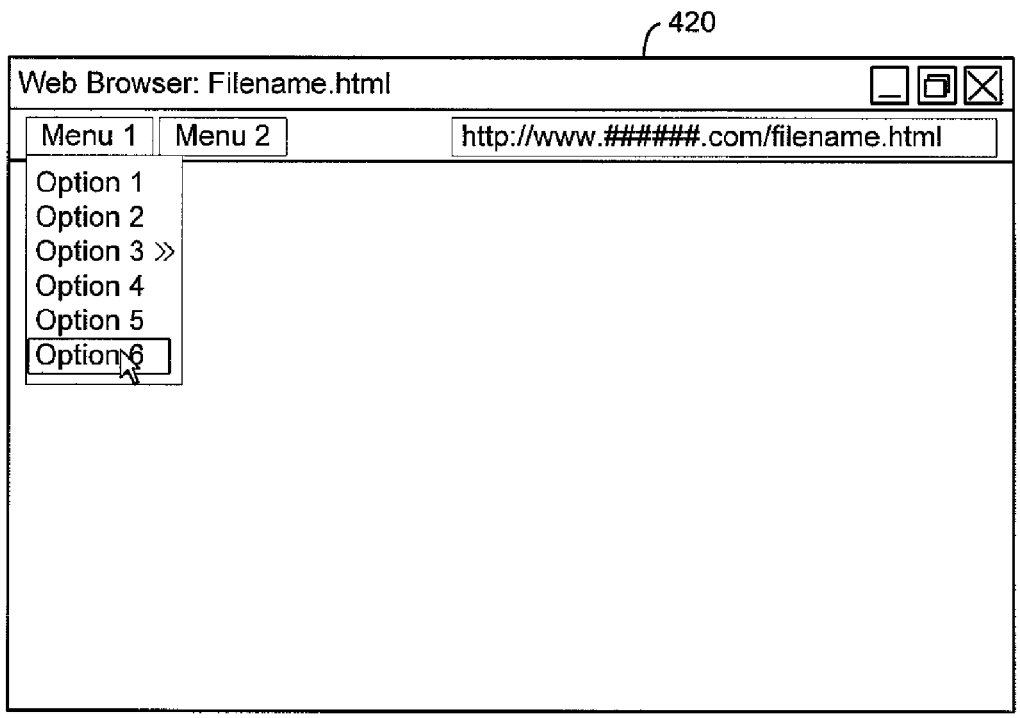
FIG. 4B is a screen shot illustrating an example of a user interaction recorded to an event log according to some embodiments.

An illustrative example of the event log 235 is now provided with reference to FIG. 4A and FIG. 4B. FIG. 4A illustrates an event record 400 in the event log 235 according to some embodiments. FIG. 4B illustrates a screen shot 420 of a graphical user interface corresponding to the event record 400.

As illustrated in screen shot 420 (FIG. 4B), the user interaction recorded in the event record 400 is the selection of "Option 6" from "Menu 1" in the window 420. The event record 400 contains identifying information about this user interaction. An event identifier 402 identifies the event record 400 and distinguishes it from other event records in the event log 235. Recorded in the event record 400 are a time stamp 404 indicating the time of the event and other metadata 410 about the event. The metadata may include a program ID 411, a file ID 412, a window title 413, a launch command 414, a link to the screenshot 415, a user input description 416, target UI object information 417, natural language description 418, and any other relevant information about the user interaction.

The user input description 416 provides details about the user input such as the user input device (e.g., mouse), input location in screen coordinates and the triggering event (e.g., left click). The target UI object information 417 may include all the information about the target UI object and its parents. In the example of screenshot 430, the target UI object is "Option 6" and its parents include "Menu 1" and the web browser. Additionally information about the web browser window, such as its location on the screen, the web address opened at the time, and other characteristics may be recorded. Depending on the filtering instructions specified by the session parameters, some portions of the metadata may not be included in the event record (e.g., the web address).

Figure 5A:
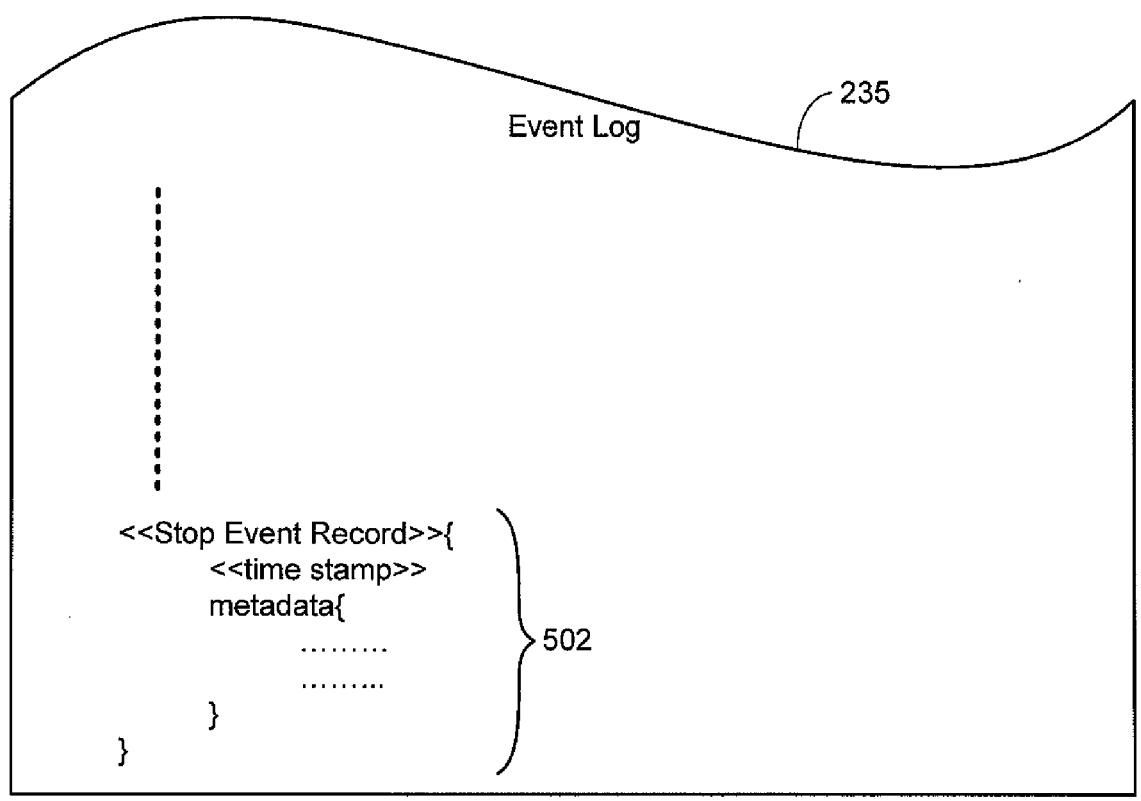
FIG. 5A is another portion of an event log file corresponding to a stop event according to some embodiments.

Turn now to FIG. 5A, which shows the conclusion of an event log 235 due to the occurrence of a stop event. In some embodiments, the event log may optionally include an event record 502 for the stop event. For example, if the session was terminated due to a user selection to stop the recording session, the event log may indicate that the stop event was a user input stop event. As another example, if the session defines a program error as a stop event, an event record may be added recording information about the error that occurred. As with other event records, the stop event record 502 may include metadata about any relevant user interface objects at the time of the stop event.

Figure 5B:
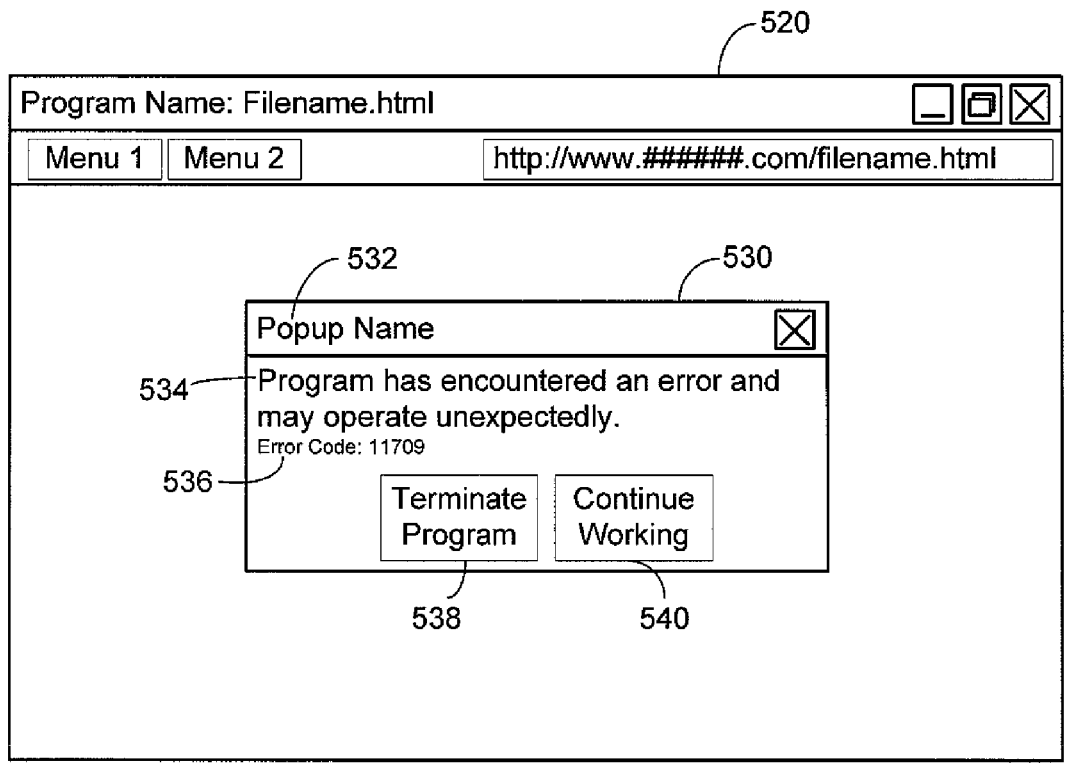
FIG. 5B is a screen shot illustrating an example of a user interface when a stop event occurred according to some embodiments.

FIG. 5B shows a screen shot 520 of a user interface corresponding to an example stop event of a recording session. In the example of screen shot 520, the stop event is an error encountered by the program. An event record 502 (FIG. 5A) may be recorded to the event log 235 with information about the relevant UI objects. For example, pop-up window name 532, the error code 536 and the textual description 534 provided in the pop-up window 530 may be recorded along with information about the parent window. In addition, if the user selected either button 538 or 540 to either terminate the program experiencing the error or continue working with the program despite the error, respectively, an indication of that user interaction may also be recorded.

Figure 6:
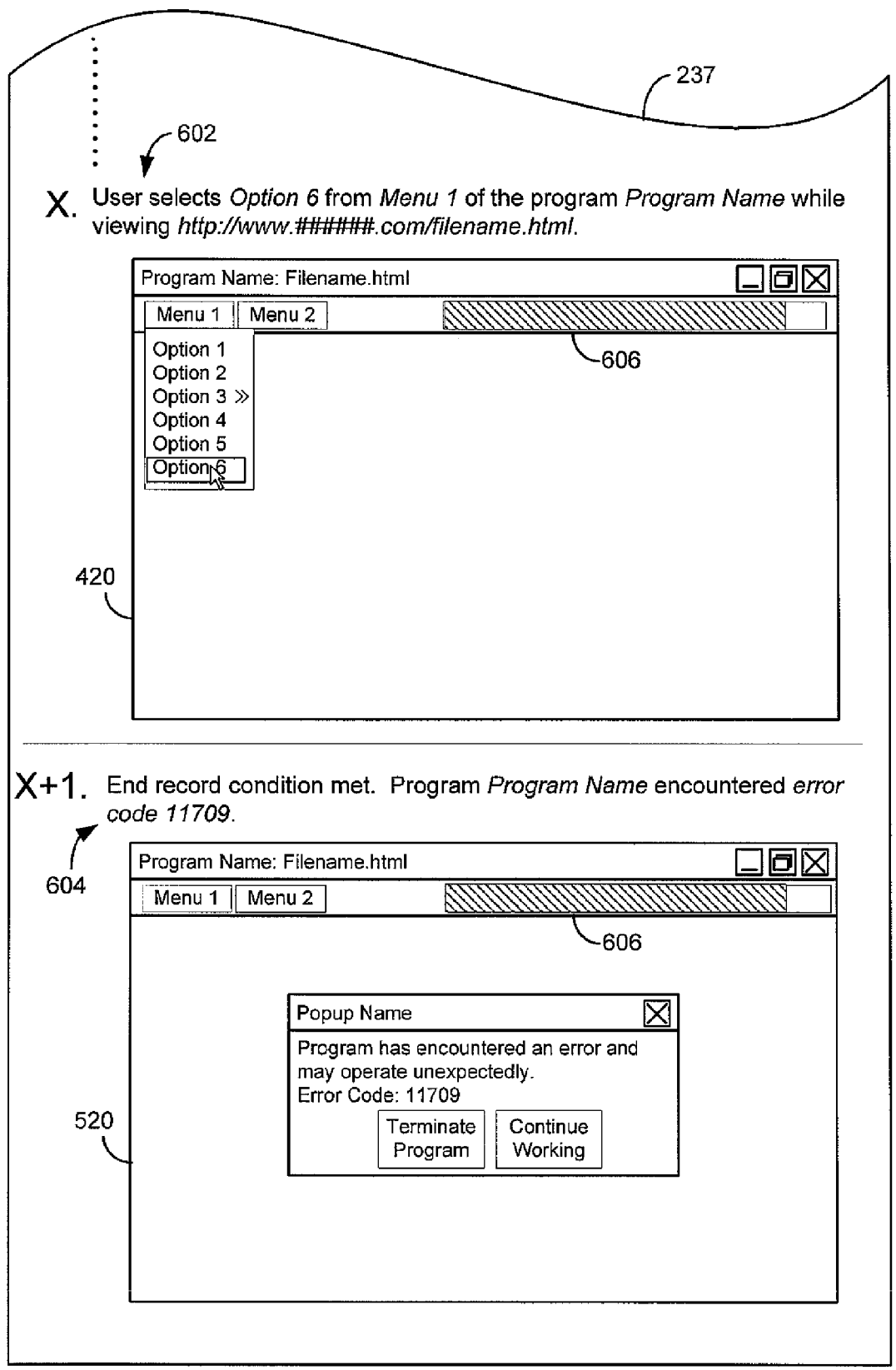
FIG. 6 is an illustration of a natural language representation of a portion of an UI event file according to some embodiments.

An example of a portion of UI event file 237 is shown in FIG. 6. Specifically, a user friendly representation of the UI event file is shown. Human readable translations 602 and 604 of the event records 400 (FIG. 4A) and 502 (FIG. 5A), respectively, are displayed along with the accompanying screen shots 420 and 520. User annotations and information that the user has decided not to share may also be deleted or blocked out. For example, the user has chosen not to share the web address which has been blocked 606 in the screen shot. This blocking may have been performed automatically, if the filtering levels required, or manually by the user.

In the representation shown in FIG. 6, a sequence of UI events are represented sequentially in a page that may be scrolled by the viewer. In some embodiments, the sequence of user interactions is sequentially played back to the viewer. In some embodiments the sequence may be animated.

Having described the configuration of the user device 110 including the recording tool 230, a description of how the recording tool may be used is provided with reference to methods 700 and 750.

Figure 7A:
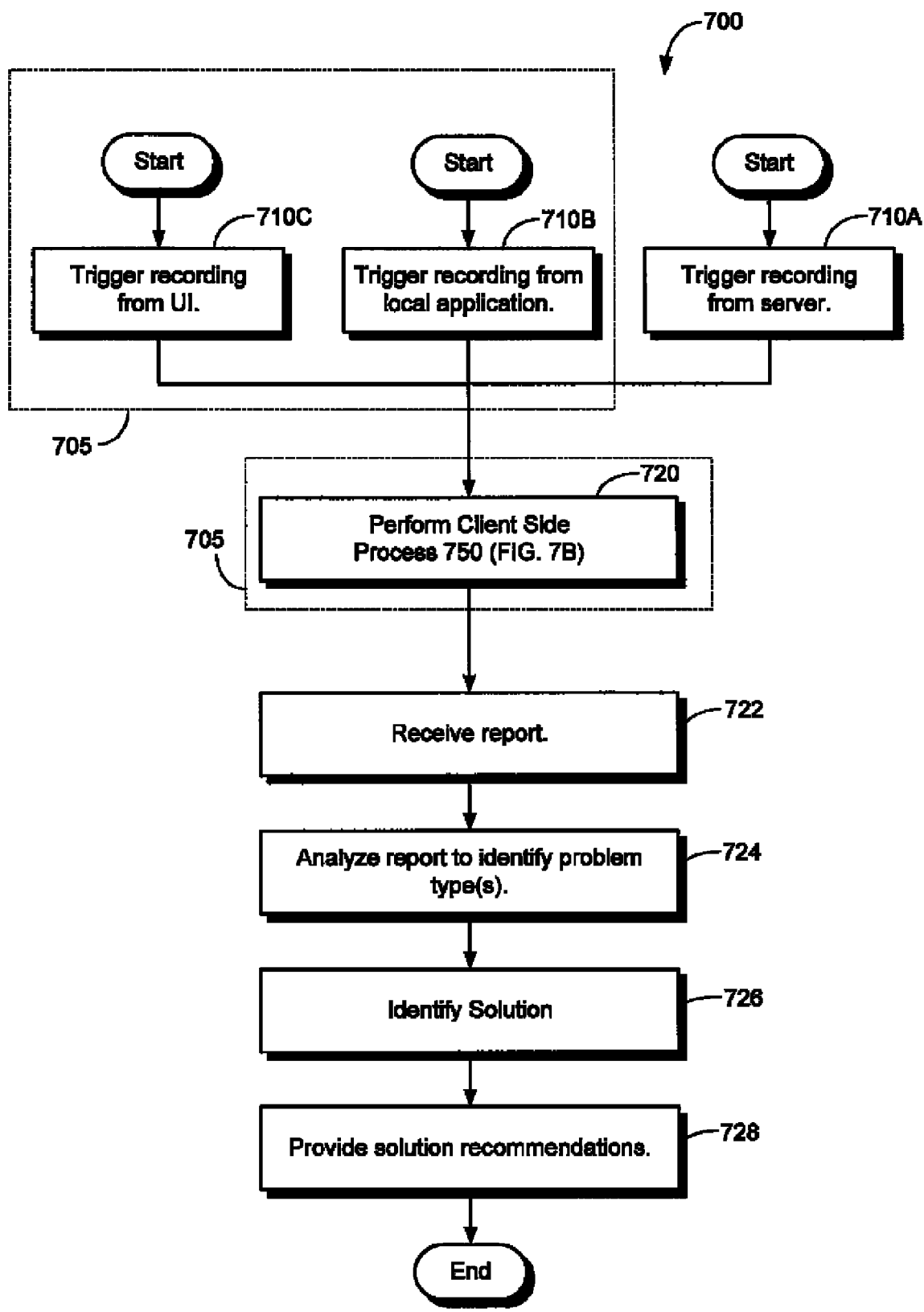
FIG. 7A is a method for identifying solutions to problems based on the users interactions with a user interface according to some embodiments.

FIG. 7A shows the method 700, which in some embodiments is performed by the system 100. The method 700 provides a solution to a user who has provided a report of a problem. In some embodiments, the steps of method 700 outlined by dashed line 705 may be performed by the user device 110 while the remaining steps are performed by the back end server 130. However, method 700 may be performed by system 100 in any suitable way.

The method 700 begins when a start event is detected on a user device. Three example start events are illustrated, however, the start event may be defined in any suitable way.

In the first case (step 710A), the method 700 begins when a recording session is triggered through the user interface of the recording tool. For example, the triggering start event may be a user selection of feedback button 280 (FIG. 2).

In the second case (step 710B), the method 700 is triggered when a start event, defined by session parameters provided by an application, is detected. For example, the error reporting client 270 may define session parameters for which the loading of an application is defined as a start event.

In the third case (step 710C), the method 700 is triggered when a start event defined from a remote server is detected. For example, this start event may be part of a set of session parameters provided from a back end server.

In any case, the detection of a start event initiates a recording session on the user device. At step 720 the method 750 is performed by the user device to produce a report which is received by the back end server at step 722. The method 750 is discussed subsequently with reference to FIG. 7B.

The report received by the back end server at step 722 contains a number of event records corresponding to a sequence of user interactions in the context of a graphical user interface. The event records include information about the user input and metadata describing the user interaction. In some embodiments, the report may also include screen shot information.

In step 724, the back end server analyzes the report to identify one or more problem types associated with the report. Problem types may range from general to specific. For example, a general problem type might be a problem with a printer driver, while a specific problem type might be a misconfiguration of a printer driver causing a printing issue with a specific printer using a specific version of the driver. Problems may be related to, for example and not limitation, the type of hardware or software being used, the operating system, the hardware or software settings, the version number of hardware or software, the task being attempted, the type of network, the user interface devices, the security features applied, the virus protection used, the hardware driver, and any other feature or combination of features that may be used to identify the type of problem. This list is by no means exhaustive.

The analysis may be performed in any suitable way. For example, in some embodiments, the back end server uses a bucketization module to identify a pattern in the sequence of user interactions that has been associated with a particular problem type. The pattern may be recognized from information contained in the event records of the sequence or a subsequence of the user interactions. In some embodiments, back end server 130 may maintain a database or other suitable record associating patterns of user interactions with problem types. In such a scenario, analyzing a problem report may involve comparing the sequence of user interactions in the problem report to sequences in the database representing known problem types.

In step 726, a solution is identified for at least one of the problems identified in step 724. The solution may be identified by searching a local knowledge base or a remote knowledge base accessible by the back end server for information relating to the identified problem type.

The solution obtained in step 726 is provided to the user in step 728. The solution may be provided to the user in any suitable way. In some embodiments, the solution is provided to the user in a way that is solution dependent. For example, the solution may be sent as instructions to the user along with any relevant patches or files that may be part of the solution. As another example, the solution is provided by obtaining consent from the user and remotely controlling the user device to implement the solution. In some embodiments, support personnel may provide instructions to the user for implementing the solution via a telephonic communications system.

Figure 7B:
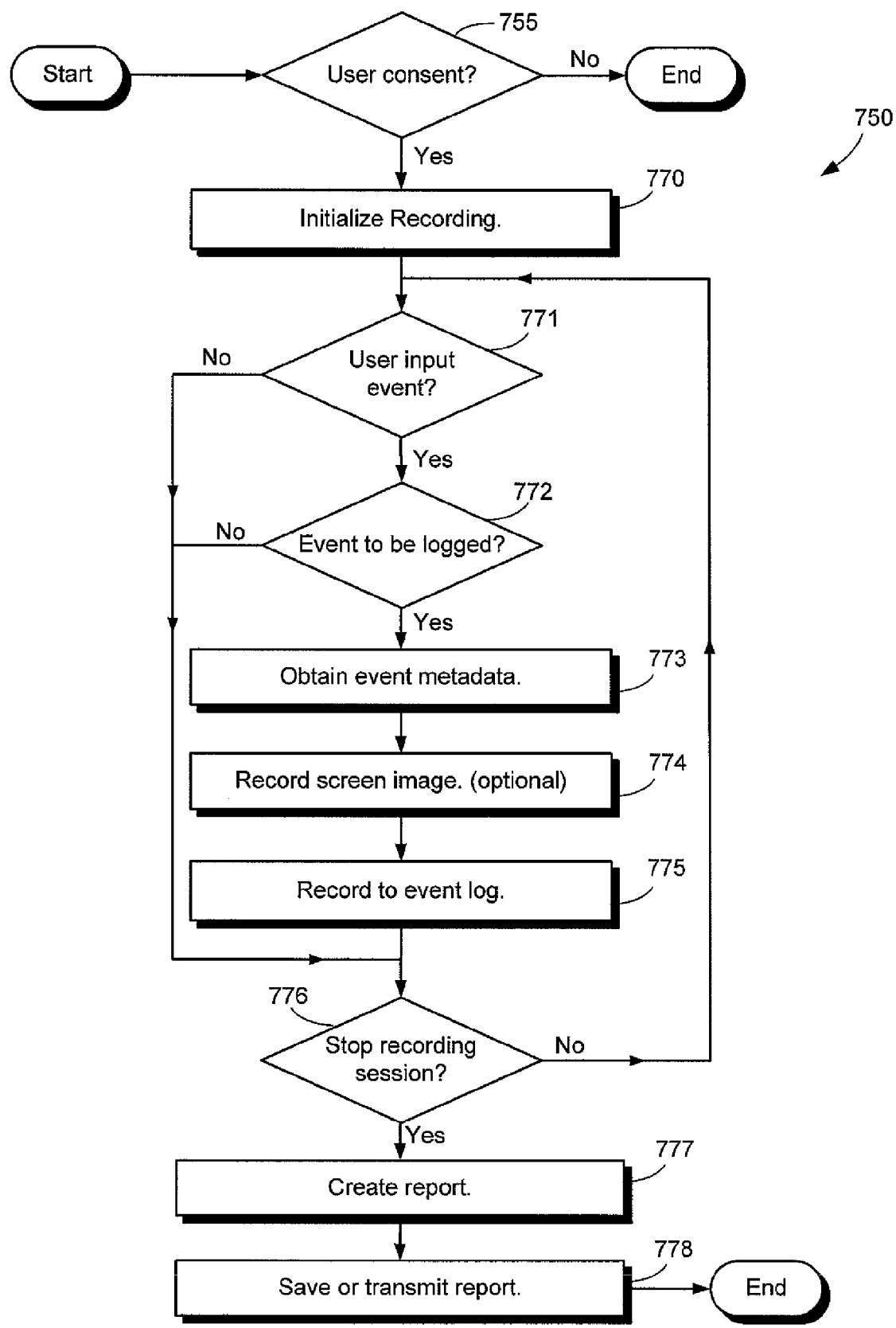
FIG. 7B is a method for creating a report of user interactions according to some embodiments.

The client side method 750 is now described with reference to FIG. 7B. Once a start event has been detected by the recording tool on the user device, user consent is verified at step 755. User consent may be obtained at any suitable time. In some embodiments, user consent it obtained whenever session parameters are pending. That is, whenever the recording tool receives session parameters and is to begin monitoring for a start event. If a user's consent cannot be verified, the method 750 ends and no report is created or transmitted.

If user consent is verified at step 755, a recording session is initialized in step 770. The recording session may be initialized, for example, by subscribing to a hooks engine which captures user inputs for creating an event log. In some embodiments, an event record of the start event may be written to the event log.

After initializing a recording session at step 770, the method 750 proceeds to step 771 to monitor UI devices for user input. If no user input is detected, the method continues to step 776 at which it is determined whether the recording session should be stopped, for example, due to detection of a stop event. If this recording session is not to be stopped, the method returns to step 771 to continue monitoring for user inputs. In some embodiments, the method is held at step 771 until a user input is detected unless interrupted by a stop event, at which point the method proceeds to step 776 and 777.

When a user input is identified at step 771, the process continues to step 772 where it is determined whether or not the user input is a user interaction that is to be logged. If it is determined that the event is not to be logged, the method continues to step 776 described previously. If, however, it is determined that the event is to be logged, the method continues to step 773 where metadata for the user interaction is obtained.

The metadata for the user interaction is determined by identifying a user interface object targeted by the user input. Once a target object is identified, the information associated with that object and its parent objects is recorded as metadata for the user interaction. The specific information that is recorded as metadata may be limited by filtering instructions for the recording session. For example, if personal information is associated with the target object or one of its parents, this information may not be recorded as metadata if required by the filtering instructions.

In some embodiments, step 772 is not performed and the method continues directly from step 771 to step 773. Step 772 may be skipped, for example, when all events are being recorded or when event filtering is applied after the completion of the recording session. In some embodiments, the determination at step 772 requires analysis of the metadata for the user interaction. Accordingly, in some embodiments, steps 772 and 773 are performed in reverse of the order shown.

Having obtained metadata for the user interaction at step 773, the method at step 774 may optionally record a screen shot in association with the user interaction. In some embodiments, whether a screen shot is recorded, and if so, how, is defined by the session parameters. In some embodiments, the entire screen is captured for every user interaction. In some other embodiments, only the current window that is being interacted with is captured. In some embodiments, only the screen shot associated with the first event and the last event in the sequence of user interactions is recorded. In yet some other embodiments, only the window for a particular process that is being recorded is captured. Step 774, is performed, if at all, in accordance with session parameters defined for the recording session and/or user settings.

At step 775, the user interaction is recorded as an event record to an event log. The screen shot, if captured, may be recorded to the event log or may be recorded in a separate file and referred to by the event record.

After writing the event record for the user interaction to the event log, the method continues to step 776 where it is determined if the recording session should be ended. If the method is to continue, the method returns to step 771 and continues to monitor and record event records for user interactions to the event log in accordance with steps 771-775.

When it is determined at step 776 that the recording session is to be stopped, the method continues to step 777 where a report of the recording session is created. In some embodiments, the event log and screen shots, if any, are simply collected into a report. In some other embodiments, the event log is processed to additionally provide a translation of the user interactions into a natural language, such as the language preferred by the user.

In some embodiments, filtering instructions are applied to the event log to ensure only the desired user interactions are written to the report. At step 777 a user may review the report file to verify that the report does not contain any information that the user does not wish to share. The user may annotate the report by adding commenting on the recording session generally or by adding comments to one or more of the user interactions recorded.

At step 778, the report is transmitted to a suitable entity. For example, the report may be emailed to a technical support specialist or transmitted to a back end server or user forum. The report could alternatively be e-mailed to a friend. Accordingly, use of the report is not a limitation on the invention. In some embodiments, user consent is again obtained before transmitting the report. In some embodiments the report may simply be saved to a local or portable storage medium.

Figure 8:
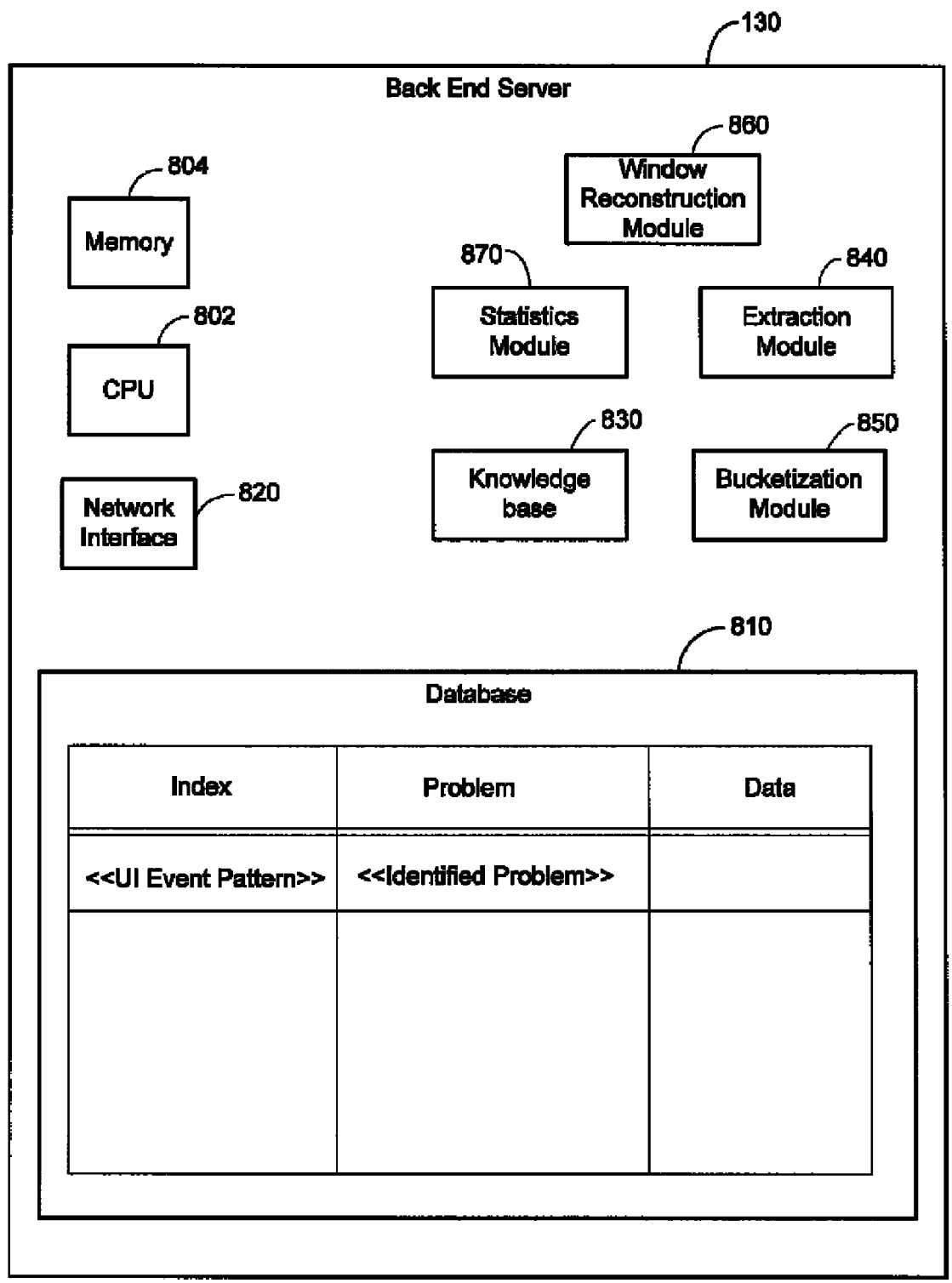
FIG. 8 is a back end server for analyzing user reports according to some embodiments.

Having described the method 750 for generating a report of a sequence of user interactions and the method 700 for identifying a solution to a problem identified from the report, a description of the back end server 130 is provided with reference to FIG. 8.

The back end server 130 may be any suitable computing device configured to process reports received from user devices. Back end server 130 has a processor 802 operably connected to a memory 804. Processor 802 may be any suitable processing device such as any of the examples provided for processor 202 of the user device 110 (FIG. 2). Memory 804 may be any suitable computer-readable storage medium such as any of the examples provided for memory 204 of the user device 110 (FIG. 2).

A network interface 820 may interface with the network 140 (FIG. 1). Network interface 820 may be any suitable combination of hardware and software configured to access network 140. For example, network interface 820 may be implemented as a network interface driver and a network interface card (NIC). The network interface driver may be configured to receive instructions from other components of back end server 130 to perform operations with the NIC. The NIC provides a physical connection to network 140. The NIC is configured to generate and receive signals for communication over network 140.

The back end server 130 may include computer executable software modules. The software modules may be stored in memory 804, and executed by processor 802, though this is just an illustrative embodiment and other storage locations and executions means are possible. In some embodiments, an extraction module 840, a bucketization module 850, a windows reconstruction module 860 and a statistics module 870, may be implemented as computer executable modules. However, these components may be implemented using any suitable combination of hardware and/or software.

The back end server 130 may be configured to receive reports, such as UI event file 237, from user devices 110 over the network 140 via network interface 820. The report is analyzed by the back end server to identify one or more problem types associated with the sequence of user interactions recorded in the report.

More specifically, the back end server 130 is configured to identify subsequences of the user interactions that are indicative that the user has encountered a particular type of problem. Problems may be identified by comparing the event records of the user interactions against a local or online database, such as database 810. Substrings in the event records, such as from the metadata, may be used to identify bucketing parameters which are then related to specific problem types.

In some embodiments, the bucketization module 850 process the report to identify problems the user encountered. The bucketization module may utilize a database such as database 810. The database 810 may include an index of UI event patterns that have been associated with particular bucketing parameters and/or problem types. In some embodiments, the database 810 indexes solutions to the problem identified from a pattern of UI events.

The bucketization module 850 analyzes the report to identify a pattern in the sequence or a subsequence of the user interactions. In some embodiments, the bucketization module 850 compares the report to UI event patterns indexed by the database 810. Subsequences of user interactions that correlate with patterns indexed in the database 810 may be assigned appropriate bucketing parameters that characterize the correlation. The values of the bucketing parameters for a particular sequence may be used to identify a problem type.

The bucketization module 850 may identify multiple subsequences in the report and associate each with one or more problem types.

In some embodiments, the bucketization module 850 may obtain additional information from the screen shots that was not recorded in the event record. An extraction module 840 is provided to extract additional metadata from the screen shots provided with the report, if any. For example, a screen shot may display an error and/or warning message dialogue box with a textual message that, for whatever reason, may not have been recorded in the metadata of the event record. The extraction module 840 performs character recognition to identify and extract from the screen shot the textual information not recorded in the metadata. This textual information may then be incorporated into the metadata for the user interaction and used by the bucketization module 850 to identify relevant bucketing parameters and problems.

Once the bucketization module 850 has identified one or more problem types, it may be configured to search a suitable knowledge base such as knowledge base 830 for solutions to the identified problems. Alternatively or additionally, other online knowledge bases may be searched. In some embodiments, problems may be categorized and solutions organized into knowledge bases based on category. For example, if the problem is associated with a particular software product, a knowledge base for that software product may be searched. A look up table may be used to relate problems to solutions.

Once the bucketization module 850 has identified a solution from a knowledge base such as knowledge base 830, the solution may be provided directly to the user over the network 140. Alternatively or additionally, a product support team 160 may assist the user in applying the solution. The bucketization module 850 may be configured to update the database with the additional UI event patterns and the associated problem types that were identified in the report.

In some embodiments, the back end server 130 may be configured to receive feedback from the user indicating whether the solution was effective. This feedback may be incorporated into the database 810, for example, via the bucketing parameters, to show how strongly correlated the sequence of user interactions is with the problem and/or solution identified.

In some circumstances, the bucketization module 850 may be unable to identify a problem type, or a solution to the problem may not exist. If a solution cannot be identified, the report may be flagged for review by the product support team 160. The product support team 160 may wish to review the user interactions recorded in the report. This may be as simple as reviewing the user friendly form of the report (see FIG. 6) and walking through the steps performed by the user to determine what the user did and what the user was trying to do. If the report does not include screen shots, a window reconstruction module 860 may be provided on the back end server 130 to reconstruct an interface for each user interaction from the metadata. In this way, support personnel may obtain a better understanding of the user interactions through the reconstructed graphical representation. The support personnel may then determine the type of problem that the user encountered.

The back end server 130 may also include a statistics module 870 to record statistics about the type and frequency of problems. Statistics may be used by the product development team 150 (FIG. 1) to identify problems with the user interface, malfunctioning hardware or software, or other improvements that may be made to the hardware or software to reduce the frequency of problem reports.

Information linking reports to problem types may be used to update database 810. When a statistically significant number of problem reports of the same problem type are received from multiple user devices, patterns of user interactions leading up to the user experiencing the particular problem type may be identified.

Figure 9:
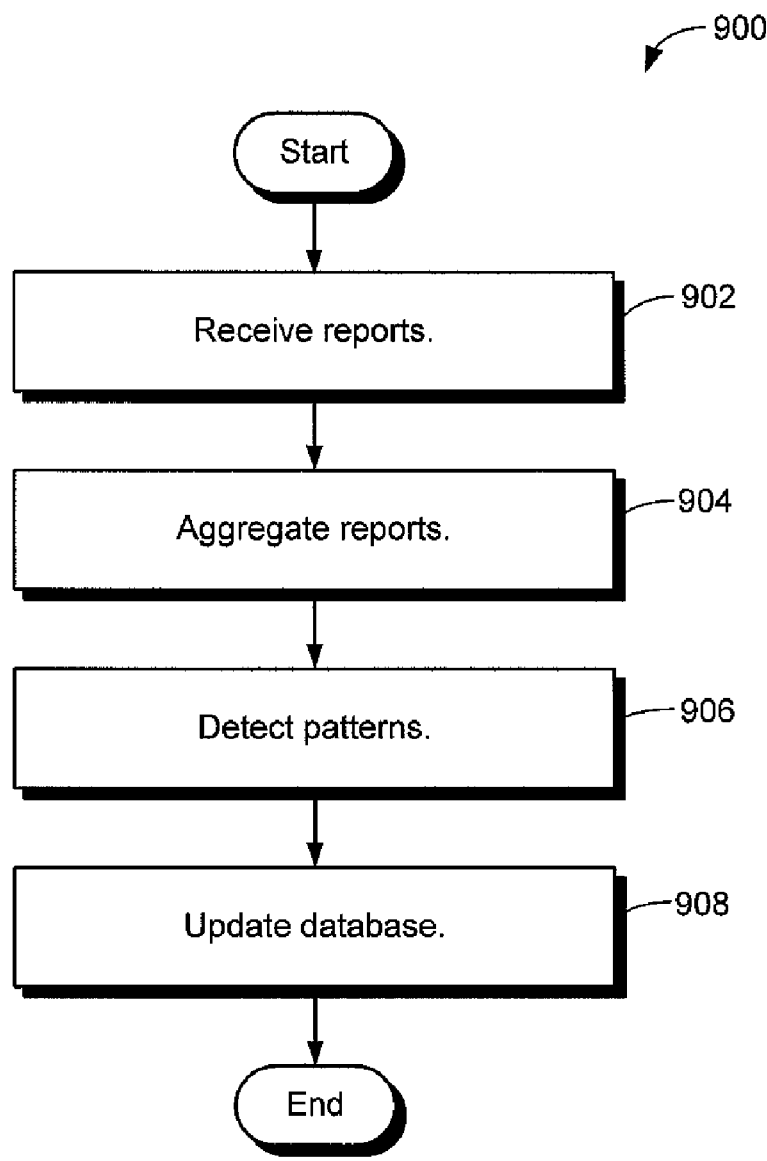
FIG. 9 is a method for processing reports from users according to some embodiments.

One function of back end server 130, or any other suitable computing device, may be to aggregate problem reports from multiple user devices to identify patterns of user interactions characterizing problem types. A method 900 for updating the database 810 is described with reference to FIG. 9. Method 900 may be performed to ensure the database accurately relates UI event patterns to problem types.

The method begins at step 902 where reports are received from user devices by the back end server 130. A problem type may be associated with each problem report stored for use in updating database 810. The problem reports may, for example, be classified by product development team 150 or product support team 160 (FIG. 1) in scenarios in which the automated process of FIG. 7A did not associate a problem type with a problem report.

At step 904, the reports and assigned problem types are aggregated, for example, into a compilation or single database.

At step 906, patterns of user interactions characterizing problem types may be extracted from the aggregated problem reports. Known techniques for classifying patterns from a sample set may be employed. However, any suitable technique for associating patterns of user interactions with specific problem types may be employed.

At step 908, the database is updated. UI event patterns are recorded to the database in association with the problem types identified from those patterns of UI events. The database may then be utilized by the bucketization module 850 to analyze reports.

Having thus described several aspects of at least one embodiment of this invention, it is to be appreciated that various alterations, modifications, and improvements will readily occur to those skilled in the art.

For example, while the system 100 was described with user devices 110 generating reports of user interactions and transmitting these reports to support entities such as back end server 130 for analysis, in some embodiments, analysis tools, such as the bucketization module 850 may be provided on the user device 110. In some embodiments, the user device may utilize a local bucketization module 850 to identify problems via a local database and/or a remote database similar to database 810 (FIG. 8). Similarly, solutions may be identified from a local and/or a remote knowledge base similar to knowledge base 830 (FIG. 8).

As another example, the recording tool 230 may be used to provide solutions to the user. One user may illustrate how certain tasks are performed by recording a sequence of user interactions demonstrating the task. The resulting report may be emailed or posted to a user forum such that another user may learn how to perform the task.

Also, tool 230 is described as providing problem reports to back end server 130. Alternatively or additionally, that reporting may be provided using error reporting client 270 or any other suitable component.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device having a display providing a graphical user interface of an application and at least one user input mechanism, the graphical user interface comprising a plurality of discrete user interface elements, the method comprising:

executing a tool on the computing device, the tool allowing the user to log interactions with arbitrary applications executing on the computing device, the tool including one or more logging controls that can be activated by the user to turn logging on and off;

when the user interacts with the logging controls to turn logging on while the application is executing:

detecting user interactions with the graphical user interface and in response capturing the interactions, each interaction comprising an indication of an interacted-with user interface element and an indication of a type of user input corresponding to the interacted-with user interface element;

recording at least a portion of the captured interactions in a report log;

when the user interacts with the logging controls to turn logging off, ceasing the capturing and recording of interactions; and transmitting the log report to a network service that collects and aggregates log reports from computing devices.

2. The method of claim 1, further comprising, when logging is turned on by the user, capturing screenshots of the graphical user interface and storing indications of the screen shot information in the report log.

3. The method of claim 1 further comprising applying a filter to determine the recorded portion of the interactions.

4. The method of claim 3, wherein the filter indicates that only interactions with the application are to be recorded.

5. The method of claim 1, wherein:

the at least one user input mechanism comprises a mouse having at least a plurality of buttons; and recording the types of the user inputs comprises recording indicia of which of the buttons have been actuated.

6. A computer-readable storage medium storing information to enable a computing device to execute computer executable modules, the modules comprising:

a tool allowing the user to log interactions with arbitrary applications executing on the computing device, the tool including one or more logging controls that can be activated by the user to turn logging on and off;

an event capture module capturing user interactions with a graphical user interface of an application and corresponding user inputs when logging has been turned on with the tool, the graphical user interface comprising user interface elements, each interaction including information indicating a corresponding user interface element;

a screen capture module to capture displayed graphics information of the graphical user interface when logging has been turned on with the tool;

a data collection module to record the captured interactions, the corresponding user inputs, and the displayed graphics information; and a report generating module to, after detection of a stop event initiated with the logging controls, generate a report including the recorded interactions, user inputs, and displayed graphics information.

7. The computer-readable storage medium of claim 6, further comprising:

a control module to instruct a network interface device to transmit the report.

8. The computer-readable storage medium of claim 6, wherein a control module is configured to receive the tool over a network.

9. The computer-readable storage medium of claim 8, wherein the control module is configured to instruct a network interface device to transmit the report over the network to the error reporting service.

10. The computer-readable storage medium of claim 6, each recorded interaction includes attributes of a target object in the graphical user interface.

11. The computer-readable storage medium of claim 10, wherein the report includes any of a program ID, a file ID, a window title, or a launch command.

12. The computer-readable storage medium of claim 6, wherein the report generating module generates the report by translating the recorded interactions and user inputs into a human readable form.

13. A method performed by a network service executing on computing system, the method comprising:

receiving reports from a plurality of user devices over a network, each device executing a local copy of an application and executing a local copy of a tool operated by a respective user to start and stop logging of interactions with the application, the tool able to log interactions with arbitrary applications, the application having a user interface comprised of discrete user interface controls, each report comprising a record of a sequence of user interactions, the record including, for each user interaction, information identifying one of the user interface controls and a type of user input inputted to interact with the one of the user interface controls; and a computer storage medium comprising:

a data structure relating patterns of user the interactions in the reports to problem types; and computer executable instructions that, when executed, based on each report and the data structure, determine problem types of the reports, respectively.

14. The method of claim 13, further comprising:

recording a number of occurrences for each problem type.

15. The method of claim 13, further comprising:

retrieving a solution from a solutions database and providing the solution to a user device among the plurality of user devices, the solution being for the problem type identified for the report received from said user device.

16. The method of claim 13, further comprising reconstructing an image of at least a portion of the graphical user interface from information in a report.

17. The method of claim 13, wherein at least one of the reports comprises a screen image associated with an interaction among the sequence of interactions of the one of the reports, and the method further comprises identifying a symbol from the screen image and recording a representation of the symbol in association with the interaction.

* * * * *